United States Patent [19]

Stegmueller

[11] Patent Number: 5,199,092
[45] Date of Patent: Mar. 30, 1993

[54] OPTOELECTRONIC DEVICE FOR COUPLING BETWEEN DIFFERENT DIMENSIONED WAVEGUIDES

[75] Inventor: Bernhard Stegmueller, Augsburg, Fed. Rep. of Germany

[73] Assignee: Siemens Aktiengesellschaft, Munich, Fed. Rep. of Germany

[21] Appl. No.: 828,551

[22] Filed: Jan. 31, 1992

[30] Foreign Application Priority Data

Feb. 8, 1991 [DE] Fed. Rep. of Germany ....... 4103929

[51] Int. Cl.$^5$ ............................................. G02B 6/26
[52] U.S. Cl. ........................................ 385/50; 385/43; 385/129
[58] Field of Search ..................... 385/24, 27, 31, 39, 385/43, 50, 129, 130, 131, 132

[56] References Cited

U.S. PATENT DOCUMENTS

| | | | |
|---|---|---|---|
| 3,948,583 | 4/1976 | Tien | 385/50 |
| 3,978,426 | 8/1976 | Logan et al. | 385/43 |
| 3,994,559 | 11/1976 | Crow | 350/96.15 |
| 4,400,053 | 8/1983 | Kazkaz | 385/39 |
| 4,773,720 | 9/1988 | Hammer | 385/43 |
| 4,795,228 | 1/1989 | Schneider | 350/96.18 |
| 4,865,407 | 9/1989 | Suzuki et al. | 385/31 |

FOREIGN PATENT DOCUMENTS 3544136  6/1987  Fed. Rep. of Germany ... 350/96.18

OTHER PUBLICATIONS

Shahar et al., "Dynamic Etch Mask Technique for Fabricating Tapered Semiconductor Optical Waveguides and Other Structures", *Appl. Phys. Lett.*, vol. 56, No. 12, 19 Mar. 1990, pp. 1098–1100.

Koch et al., "Tapered Waveguide InGaAs/InGaAsP Multiple-Quantum-Well Lasers", *IEEE Photonics Technology Letters*, vol. 2, No. 2, Feb. 1990, pp. 88–90.

Abstract of Japanese Published Application 63-094205 Apr. 25, 1988 *Patent Abstracts of Japan*, vol. 12, No. 331, [P755] Sep. 7, 1988.

Abstract of Japanese Published Application 57-183091 of Nov. 11, 1982 *Patent Abstracts of Japan*, vol. 7, No. 27, [E-156] Feb. 3, 1983.

Shani, "Efficient Coupling of a Semiconductor Laser to an Optical Fiber by Means of a Tapered Waveguide on Silicon", *Appl. Phys. Lett*, vol. 55, No. 23, 4 Dec. 1989, pp. 2389–2391.

*Primary Examiner*—Frank Gonzalez
*Attorney, Agent, or Firm*—Hill, Steadman & Simpson

[57] ABSTRACT

An optoelectronic device for optical coupling between different dimensioned waveguides has an arrangement forming a narrow waveguide and an arrangement forming a broad waveguide, which extend parallel to one another and are superimposed with each other to provide a superimposing wave guidance in a region and transverse dimensions of the narrow waveguide are continuously reduced to zero in the shape of a taper in a second region so that only the broad wave guidance on the basis of the broad ridge fashioned in the broad waveguide are present in a region adjoining this second region having the taper.

15 Claims, 3 Drawing Sheets

OPTOELECTRONIC DEVICE FOR COUPLING BETWEEN DIFFERENT DIMENSIONED WAVEGUIDES

BACKGROUND OF THE INVENTION

The present invention is directed to an optoelectronic device for coupling different dimensioned waveguides, which device comprises means for a narrow wave guidance in the lateral direction and means for a broad wave guidance in the lateral direction, said two means being arranged to extend parallel to one another with one of the means being continually reduced in a transversal direction in a section so that both a narrow and a broad wave are guided in a region adjacent this section and only one of the waves is guided in the region on the other side of this section.

A critical condition for optoelectronic transmission technology is the effective, stable and simple adjustable optical coupling between an optical fiber as a transmission medium and an optoelectronic device as either a transmission element or as a reception element. To this end, the electromagnetic (EM) field distribution crosswise (either transversely or laterally) vis-a-vis the propagation direction of the light in the optical fiber must be matched to the field distribution in the optoelectronic device. The wave guidance in the optoelectronic device (OED) generally occurs with waveguides wherein the electromagnetic field distribution crosswise vis-a-vis the propagation direction of the light differs greatly from that which is in an optical fiber. A matching of the wave guidance between the optoelectronic device and the optical fiber is achieved with the assistance of an adiabatic taper. Such an adiabatic taper is composed of a waveguide whose lateral and transversal wave guidance changes along the propagation direction of the light so that no optical losses due to conversion of modes will occur. To this end, the geometric shape of the waveguide in the optoelectronic device is hitherto varied along the propagation of the light, both in a lateral, as well as a transverse, direction. For example, see an article by A. Shahar et al entitled "Dynamic etch mask technique for fabricating tapered semiconductor optical waveguides and other structures", *Appl. Phys. Lett.*, Vol. 56, No. 12, Mar. 19, 1990, pp 1098–1100. Technological measures for varying the geometric dimensions in both direction perpendicular to the light propagation are required for this purpose.

SUMMARY OF THE INVENTION

An object of the present invention is to provide an optoelectronic device that can be manufactured optimally simply and enables coupling between differently dimensioned waveguides, particularly coupling to an optical fiber.

This object is achieved with the inventive device comprising first means for a narrow wave guidance in a lateral direction and second means for a broad wave guidance in a lateral direction, both the first means for narrow wave guidance and the second means for broad wave guidance being arranged to extend parallel to one another and being superimposed, at least along a longitudinally extending portion or section of the waveguide, one of the means for wave guidance being continually reduced in a transverse direction along this section so that a narrow wave guidance is present adjoining this section in a longitudinal direction on one side and a broad wave guidance is present adjoining the section in a longitudinal direction on the other side of the section.

The inner part of the optical fiber provided for a wave guidance usually has a larger diameter than the lateral dimension of the waveguide in a semiconductor component. A widening of the wave guidance is therefor required at least for coupling an optical fiber in the longitudinal direction of the waveguide in a component. In order to achieve this widening without a conversion of the guided mode and to simultaneously enable a simple manufacturability of the component, an adiabatic taper that tapers in only one direction is inventively utilized. A structure corresponding to the present invention provides that a narrow wave guidance, for example on the basis of a strip-shaped waveguide layer embedded all around in a material having a lower refractive index, and a broad wave guidance that corresponds to the dimensions of the wave guidance of the optical fiber on the basis of a ridge waveguide are simultaneously present in a section in a longitudinal direction of the wave guidance and in that the strip-shaped, narrow waveguide is continuously diminished in thickness only in a transversal direction along this section. The waveguide ends in a semiconductor material that is likewise suitable for propagation of the radiation and wherein a broader, lateral wave guidance occurs on the basis of the ridge waveguide fashioned in this material. A reversed matching of the broad wave guidance to the narrow wave guidance is also correspondingly possible. What is critical for the structure of the invention is that the lateral structure is not varied. A taper-shaped structure, therefore, occurs only in the transversal direction, for which reason the structure of the invention is significantly simpler to manufacture than the components known from the prior art.

Over a length of at least approximately 100 μm, the component of the invention contains two different waveguide structures that are arranged approximately concentrically relative to one another so that they represent a waveguide in common. One of these waveguide structures is eliminated or inserted on a basis of a one-dimensional, continuous reduction of the dimensions of this waveguide structure within the length of at least approximately 500 μm, but, optimally 1000 μm through 1500 μm. The waveguide structure can be a buried heterostructure or ridge waveguide. The manufacture can occur with the assistance of wet-chemical etching, ion beam etching or selective epitaxy.

Other advantages and features of the invention will be readily apparent from the following description of the preferred embodiments, the drawings and claims.

DESCRIPTION OF THE PREFERRED EMBODIMENTS

Figure 1:
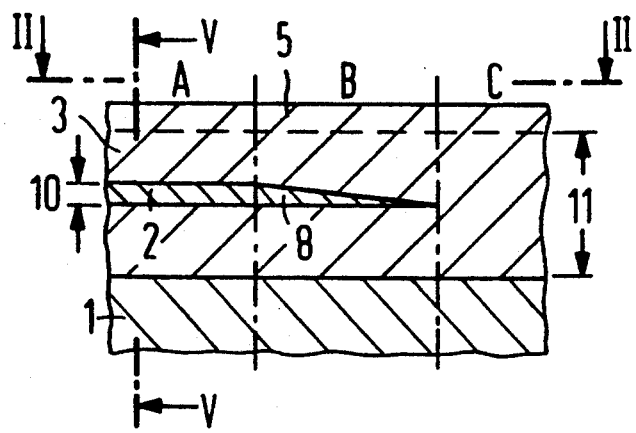
FIG. 1 is a longitudinal cross sectional view taken along the lines I—I of FIG. 2.
Figure 2:
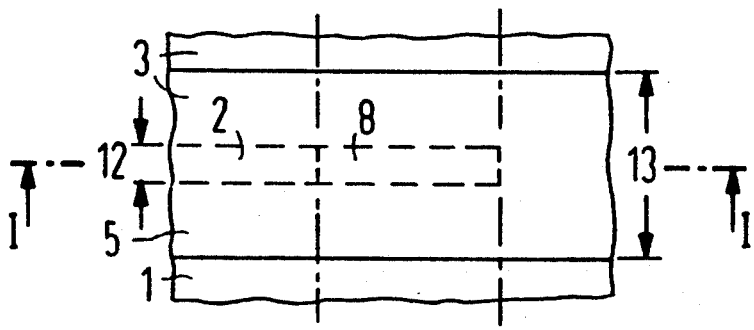
FIG. 2 is a plan view taken from the lines II—II of FIG. 1.

The principles of the present invention are particularly useful when incorporated in a device illustrated in FIG. 1. The device of FIG. 1 includes a base 1, which can be either a substrate or a semiconductor layer and which contains a layer of semiconducting material that forms a broad waveguide 3. A narrow waveguide 2 is embedded in this broad waveguide 3. The designations "narrow" and "broad" refer to the lateral expanse of the appertaining waveguide. The same arrangement is shown in FIG. 2, wherein the lateral dimension 12 of the narrow waveguide 2 and the lateral dimension 13 of the waveguide 3 are illustrated. The transversal dimension 10 of the narrow waveguide 2 is correspondingly smaller than the transversal dimension 11 (FIG. 1) of the broad waveguide 3, wherein the narrow waveguide 2 is embedded. The wave guidance occurs in the layer of the broad waveguide 3 on the basis of a broad ridge 5 fashioned on an upper surface. Both wave guidances are simultaneously present in a region A of the device. In a region B, the narrow waveguide 2 is continually reduced in thickness in the transverse direction, as illustrated in FIG. 1, and this direction is perpendicular to the surface of the substrate or base 1. The narrow waveguide 2 ends at the end of the region B so that only the wave guidance on the basis of the broad ridge 5 in the broad waveguide 3 will be present in the region C. In the region B, the narrow waveguide has the shape of a taper 8 that tapers wedge-like only in the transversal direction.

Figure 3:
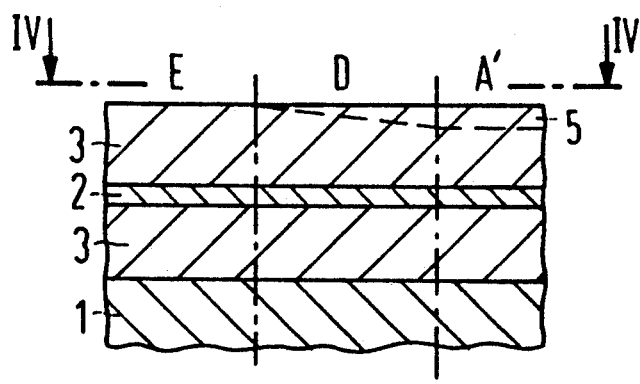
FIG. 3 is a longitudinal cross sectional view of an embodiment of the present invention taken along lines III—III of FIG. 4.
Figure 4:
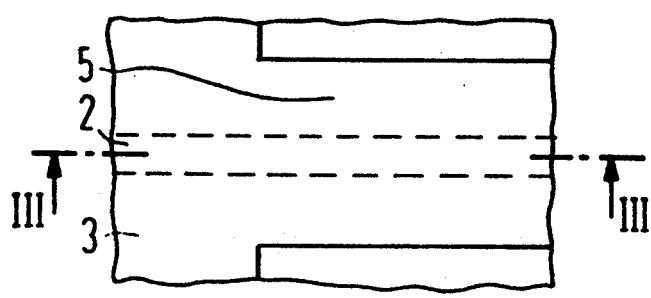
FIG. 4 is a top plan view taken from the lines IV—IV of FIG. 3.

A modification of the embodiment is illustrated in FIG. 3, wherein the broad wave guidance of the waveguide 3 is continuously reduced in a region D. Both waveguides are simultaneously present in a region A', for example, which corresponds to the region A of FIG. 1. In the region D, the height of the broad ridge 5 on the surface of the waveguide 3 is continually reduced to zero so that in the adjoining region E, the surface of the broad waveguide 3 is planar and the lateral wave guidance occurs only on the basis of the narrow waveguide 2.

Figure 5:
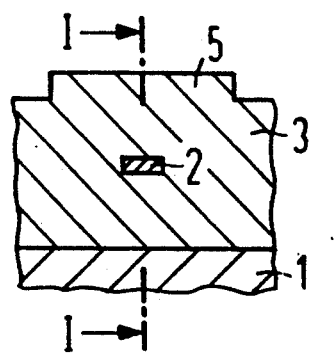
FIG. 5 is a transverse cross sectional view taken along the lines V—V of FIG. 1.

In both the devices of FIG. 1 and FIG. 3, the cross section taken in the area A of FIG. 1 or the area A' of FIG. 3 will appear as the cross section of FIG. 5.

InP and GaAs, for example, come into consideration as the material for the broad waveguide 3. The narrow waveguide 2 can be, for example, of InGaAsP or GaAlAs. It is also possible that the broad waveguide 3 is composed of InGaAsP or, respectively, GaAlAs having a different composition than that of the narrow waveguide 2. The surface of the broad waveguide or, respectively, of the broad ridge 5 can be covered with a dielectric, for example with an oxide.

The refractive index of the material of the narrow waveguide 2 is, respectively, higher than the refractive index of the material of the broad waveguide 3 in the exemplary embodiment. The refractive index of the material for the broad waveguide 3 is, in turn, higher than the refractive index of the base 1 that is, in turn, higher than the refractive index of an oxide that may, potentially, be applied on the surface.

Figure 6:
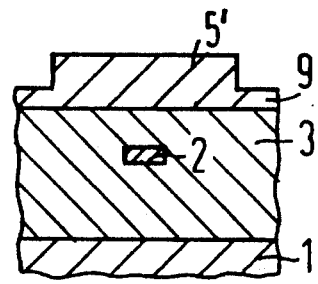
FIG. 6 is a cross sectional view similar to FIG. 5 of another embodiment of the present invention.
Figure 7:
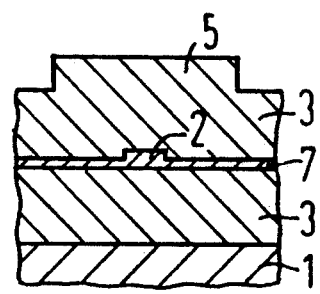
FIG. 7 is a transverse cross sectional view similar to FIG. 5 of yet another modification of the present invention.

A modification of the device is shown in FIG. 6, wherein a broad ridge 5' is formed in a separate layer 9 that is provided on the broad waveguide 3. This cover layer 9, likewise, can be of InP or InGaAsP or, respectively, GaAs or GaAlAs.

Figure 8:
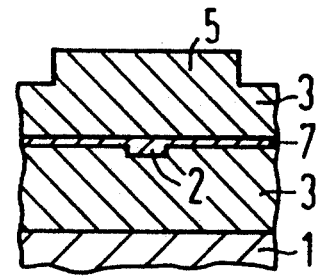
FIG. 8 is a transverse cross sectional view of a variation of the modification of FIG. 7.
Figure 9:
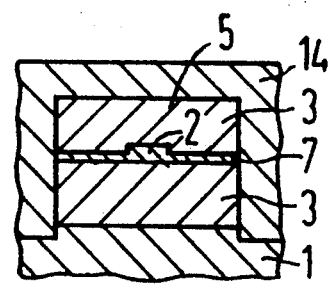
FIG. 9 is a transverse cross sectional view of yet another modification of the present invention.

In another embodiment, the narrow waveguide 2 is constructed as a ridge-shaped waveguide in a wave guiding layer 7, which is interposed between the material forming the broad waveguide 3. In this exemplary embodiment, the narrow waveguide 2 is fashioned on the side of the waveguide layer 7 facing away from the base 1 and, in the embodiment illustrated in FIG. 8, the narrow waveguide 2 is fashioned on the side of the wave guiding layer 7 facing toward the base 1.

In another embodiment, a broad ridge 5 is fashioned to extend into the base 1. A waveguide layer 7 having a ridge-shaped, narrow waveguide 2 is then situated between two portions of the broad waveguide 3. The surface of the broad ridge 5 is covered with a dielectric layer 14 in this embodiment.

Figure 10:
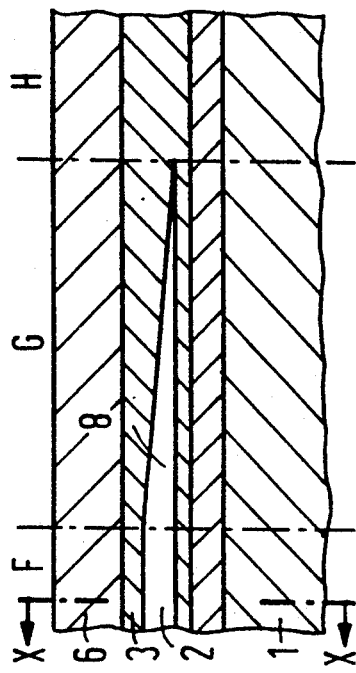
FIG. 10 is a transverse cross sectional view of a buried heterostructure device in accordance with the present invention taken along the lines X—X of FIG. 13.
Figure 13:
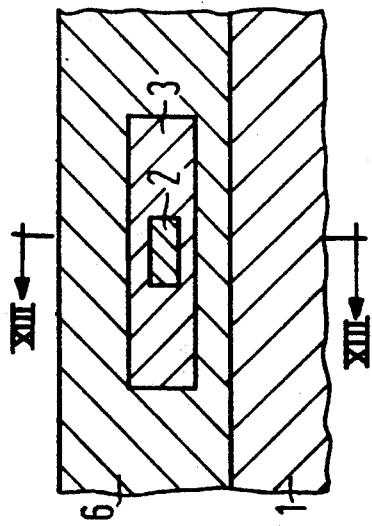
FIG. 13 is a longitudinal cross sectional view taken along the lines XIII—XIII of FIG. 10.

Instead of occurring on the basis of a ridge, the broad wave guidance can also occur in a buried heterostructure having a broad waveguide 3 embedded in a confinement 6. The refractive indices, respectively, increase from the confinement 6 via the broad waveguide 3 to a narrow waveguide 2, which proceeds approximately concentric in the broad waveguide 3, as illustrated in the embodiments of FIGS. 10 and 13. As a result of these different wave guided indices, a respective lateral or transversal wave guidance is effected. Corresponding to the embodiment of FIG. 1, the thickness, for example, of the transversal dimension of the narrow waveguide 2 is continually reduced in a region G (FIG. 13) in this embodiment so that only the broad waveguide 3 is still present in the adjoining region H. In the region F, both waveguides are present and have the cross section which is shown in FIG. 10.

Figure 11:
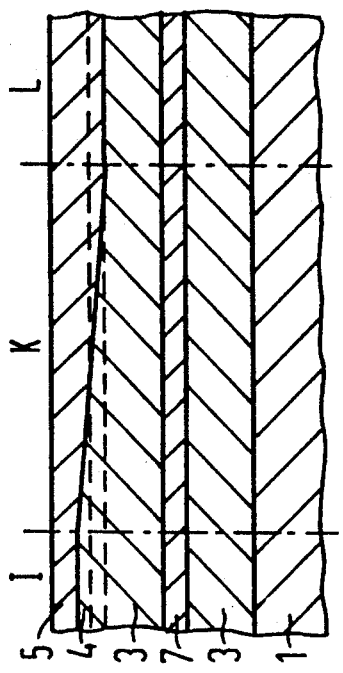
FIG. 11 is a transverse cross sectional view of a modification of the device of the present invention utilizing ridge waveguides.
Figure 14:
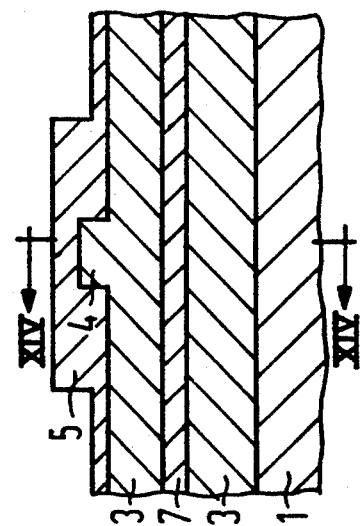
FIG. 14 is a longitudinal cross sectional view taken along the lines XIV-XIV of FIG. 11.

It is also possible to realize both superimposed wave guidances on the basis of ridge waveguides. In the device of FIGS. 11 and 14, a waveguide layer 7 is present in the broad waveguide 3. A surface of the broad waveguide 3 is provided with a narrow ridge 4 for a lateral wave guidance. A further layer having a broad ridge 5 for a broad wave guidance is constructed thereabove. According to the embodiment of FIG. 14, both wave guidances can be simultaneously present in the region 1, while in an adjoining region K, the height of the narrow ridge 4 is continuously reduced to zero and in the region L adjoining the region K, only the broad ridge 5 and, thus, only the broad wave guidance is still present. Alternately, it is also possible to reduce the height of the broad ridge 5 to zero in the region K so that only the narrow wave guidance on the basis of the narrow ridge 4 is still present in the region L, which wave guidance is respectively reduced in the middle region K and is dependent on the respective employment of the device of the invention.

Figure 12:
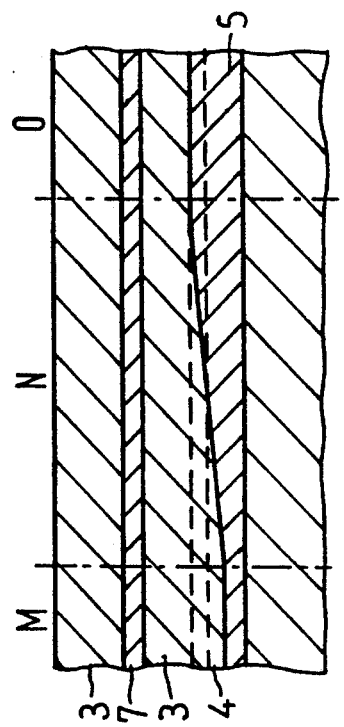
FIG. 12 is a transverse cross sectional view of another modification utilizing ridge waveguides in accordance with the present invention.
Figure 15:
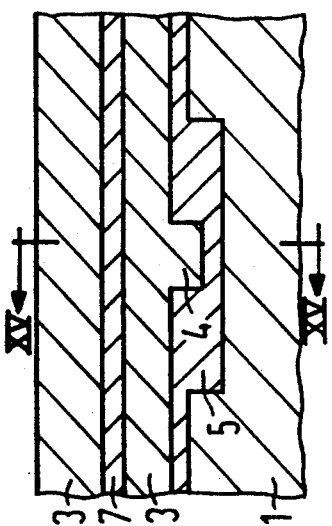
FIG. 15 is a longitudinal cross sectional view taken along the lines XV—XV of FIG. 12.

Instead of fashioning the narrow ridge 4 and the broad ridge 5 in the surface of the component, these ridge-shaped wave guidances can also be present in the base 1 in order to enable a planar surface of the component. In this case, as illustrated in FIGS. 12 and 15, a broad ridge 5 is etched into the base 1, for example the substrate. Additionally, a trench 4 is situated in the broad ridge 5. The waveguide layer 7 is again grown surface-wide and is covered by an additional layer of the material 3.

As illustrated in FIG. 15, in the region M, both ridges 4 and 5 are present and the ridge 4 is gradually decreased in the region N so that in the region or section O, only the ridge 5 is still present. As in the previous embodiment, this can be reversed so that the ridge 4 is present in all regions and the ridge 5 disappears in the regions, such as N.

A simple possibility of enabling a matching between wave guidances having different dimensions on the basis of a modification of one waveguide occurring exclusively in a transversal direction is disclosed in all the described embodiments and in the obvious combinations and generalizations thereof.

Although various minor modifications may be suggested by those versed in the art, it should be understood that I wish to embody within the scope of the patent granted hereon all such modifications as reasonably and properly come within the scope of my contribution to the art.

I claim:

1. An optoelectronic device comprising a waveguide having first means for a narrow wave guidance in the lateral direction and second means for a broad wave guidance in the lateral direction, said first means and said second means being arranged to extend parallel to one another and being superimposed at least along a longitudinally directed portion of the waveguide, the second means comprising a broad ridge fashioned in a broad waveguide layer and said first means comprising a narrow waveguide having a higher refractive index being embedded in the material of the broad waveguide layer, one of said first and second means being continually reduced in thickness in the transversal direction along a section of the longitudinally directed portion so that a narrow wave guidance occurs adjoining one side of said section in the longitudinal direction and a broad wave guidance occurs adjoining the other side of said section in the longitudinal direction.

2. An optoelectronic device according to claim 1, wherein the first means is continually reduced in that the transversal thickness of the narrow waveguide continuously decreases.

3. An optoelectronic device according to claim 1, wherein the second means is continually reduced in that the height of the broad ridge continuously decreases.

4. An optoelectronic device comprising a waveguide having first means for a narrow wave guidance in the lateral direction and second means for a broad wave guidance in the lateral direction, said first means and said second means being arranged to extend parallel to one another and being superimposed at least along a longitudinally directed portion of the waveguide, the first means being composed of a narrow ridge fashioned in a first waveguide and the second means comprising a broad waveguide having a higher index of refraction being embedded in the first waveguide, one of said first and second means being continually reduced in thickness in the transversal direction along a section of the longitudinally directed portion so that a narrow wave guidance occurs adjoining one side of said section in the longitudinal direction and a broad wave guidance occurs adjoining the other side of said section in the longitudinal direction.

5. An optoelectronic device according to claim 4, wherein the first means are continuously reduced in that the height of the narrow ridge continuously decreases.

6. An optoelectronic device according to claim 4, wherein the second means are continually reduced in that the transverse thickness of the broad waveguide continuously decreases.

7. An optoelectronic device comprising a waveguide having first means for a narrow wave guidance in the lateral direction and second means for a broad wave guidance in the lateral direction, said first means and said second means being arranged to extend parallel to one another and being superimposed at least along a longitudinally directed portion of the waveguide, the first means comprising a narrow ridge fashioned in a first waveguide layer embedded in a second waveguide layer and the second means comprising a broad ridge fashioned on said second waveguide layer, one of said first and second means being continually reduced in thickness in the transversal direction along a section of the longitudinally divided portion so that a narrow wave guidance occurs adjoining one side of said section in the longitudinal direction and a broad wave guidance occurs adjoining the other side of said section in the longitudinal direction.

8. An optoelectronic device according to claim 7, wherein the second means are continually reduced in that the height of the broad ridge is continuously decreased.

9. An optoelectronic device according to claim 7, wherein the first means are continually reduced in that the height of the narrow ridge continuously decreases.

10. An optoelectronic device comprising a waveguide having first means for a narrow wave guidance in the lateral direction and second means for a broad wave guidance in the lateral direction, said first means and said second means being arranged to extend parallel to one another and being superimposed at least along a longitudinally direction portion of the waveguide, the first means comprising a narrow waveguide having a higher index of refraction being embedded in a broad waveguide and said second means comprising lateral limitations of the broad waveguide with material having a lower refractive index, one of said first and second means being continually reduced in thickness in the transversal direction along a section of the longitudinally divided portion so that a narrow wave guidance occurs adjoining one side of said section in the longitudinal direction and a broad wave guidance occurs adjoining the other side of said section in the longitudinal direction.

11. An optoelectronic device according to claim 10, wherein the first means are continually reduced in that the transverse thickness of the narrow waveguide continuously decreases.

12. An optoelectronic device according to claim 10, wherein the second means are continually reduced in that the transversal thickness of the broad waveguide continuously decreases.

13. An optoelectronic device comprising a waveguide having first means for a narrow wave guidance in the lateral direction, said first means and said second means being arranged to extend parallel to one another and being superimposed at least along a longitudinally directed portion of the waveguide, the first means comprising a narrow ridge and the second means comprising a broad ridge surrounding said narrow ridge at least in one section having superimposed wave guidance, one of said first and second means being continually reduced in thickness in the transversal direction along an area of the longitudinally directed portion so that a narrow wave guidance occurs adjoining one side of the area in the longitudinal direction and a broad wave guidance occurs adjoining the other side of the area in the longitudinal direction.

14. An optoelectronic device according to claim 13, wherein the second means are continually reduced in that the height of the broad ridge continuously decreases.

15. An optoelectronic device according to claim 13, wherein the narrow ridge and broad ridge have different refractive indices and wherein the first means are continually reduced in that the height of the narrow ridge continuously decreases.

* * * * *